Feb. 7, 1961   R. F. NICKERSON   2,970,928
LIGHT-DIFFUSING GLASS ARTICLES AND PROCESS OF PREPARING SAME
Filed Oct. 19, 1955   2 Sheets-Sheet 1
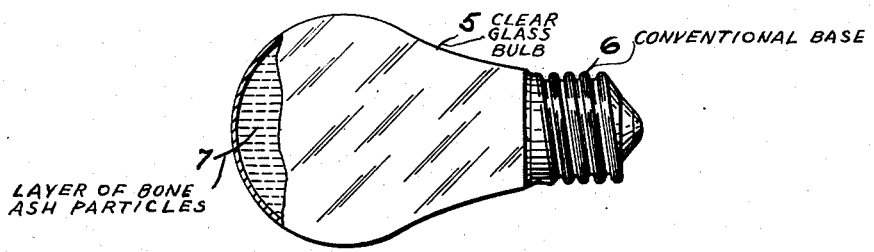
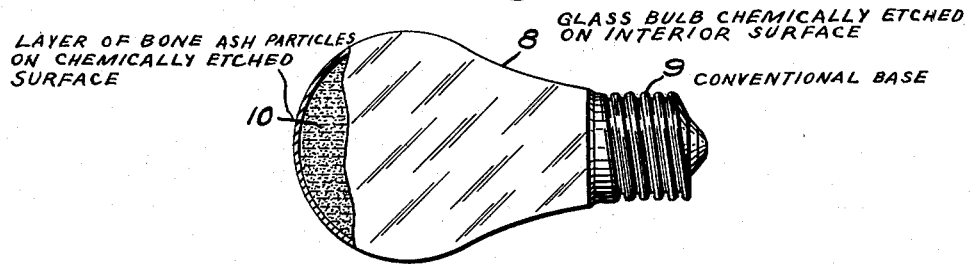
Inventor:
Ralph F. Nickerson,
by Richard W. Stemberg
Attorney Feb. 7, 1961 R. F. NICKERSON 2,970,928
LIGHT-DIFFUSING GLASS ARTICLES AND PROCESS OF PREPARING SAME
Filed Oct. 19, 1955 2 Sheets-Sheet 2

INVENTOR.
RALPH F. NICKERSON
BY

United States Patent Office 2,970,928
Patented Feb. 7, 1961

2,970,928

LIGHT-DIFFUSING GLASS ARTICLES AND PROCESS OF PREPARING SAME

Ralph F. Nickerson, Marblehead, Mass., assignor to Monsanto Chemical Company, St. Louis, Mo., a corporation of Delaware Filed Oct. 19, 1955, Ser. No. 541,437

14 Claims. (Cl. 117—17)

The present invention relates to improved methods for imparting light-diffusing properties to clear glass and for improving the light-diffusing properties of etched or frosted glass, particularly clear or frosted incandescent lamp glass envelopes. This invention also relates to novel glass articles, and more particularly to novel electric incandescent lamp bulbs, which have unique light-diffusing and light-transmitting properties.

It has been proposed heretofore to etch the surface of glass by a chemical etching action, for example, by the use of hydrofluoric acid, to give the glass a frosted appearance and thus materially reduce its normal transparency and, at the same time, impart light-diffusing properties thereto. In the case of incandescent lamp bulbs, the lamp envelope is first etched and the bulb is then made from the etched envelope in the normal manner, resulting in what is commonly known as the inside frosted incandescent lamp bulb, or, in brief, the inside frosted bulb. A method of preparing such bulbs is illustrated in the U.S. patent to Pipkin, No. 1,687,510, issued October 16, 1928. The unlighted bulbs have a characteristic grayish or silver-gray appearance which is not very attractive. The lighted bulbs give off a diffused light as compared with lighted clear glass bulbs or lamps, but the extent to which the light is diffused leaves much to be desired. Thus, in such bulbs the light emanating from the immediate vicinity of the filaments is considerably brighter and harsher than the light emanating from other parts of the bulbs with the result that the bulbs provide a harsher and more glaring type of light than is often desired.

It has also been proposed in the U.S. patent to Pipkin, No. 2,545,896, to provide a light-diffusing coating of silica on the inside surface of a frosted electric bulb envelope, which silica results from the combustion of an inflammable silicon compound and forms a suspension in a gas of particles of silica which are ultimately collected by or deposited on the envelope to be coated and are adherent thereto. The silicon compounds employed are not only relatively expensive, but the process employed results in some discharge of silica into the atmosphere and on the equipment used and this necessitates frequent shut downs for cleaning the equipment.

It is one object of the present invention to provide a simple, inexpensive and efficient process for producing light-diffusing and light-transmitting glass articles.

It is a further object of this invention to provide a simple, inexpensive and efficient process for producing a light-diffusing and light-transmitting layer on the inside surface of incandescent glass envelopes, which layer is not only self-adhering to the glass, but also provides a very uniform diffusion of light.

It is a further object of this invention to provide novel glass articles having a light-diffusing and light-transmitting layer self-adhering to the glass surface, which layer diffuses the light in a highly uniform manner.

It is a further object of this invention to provide novel electric incandescent lamp bulbs which have a strikingly white appearance and emit, when lighted, a substantially uniform, diffused light.

Still further objects and advantages of the present invention will be apparent from the following description and accompanying drawing and the appended claims.

The process of this invention is carried out, in general, by bringing a stream of finely-divided, solid particles of calcium phosphate material, preferably bone ash, in a gas such as air into contact with a heated glass surface which is below the softening point of glass and exerts an electric attraction for such particles, whereby the particles adhere to the glass surface and form a light-diffusing and light-transmitting layer of the material. Subsequently, the glass having such layer thereon is steamed to fix the deposited layer on the glass surface, that is, the steaming causes the layer of phosphate to adhere by itself to the glass surface so that the layer does not flake off on tapping or jarring the glass article under conditions of normal handling or use.

This invention may be used on a large variety of glass articles such as clear or etched glass plate, clear or etched electric incandescent glass envelopes used in the production of glass electric bulbs and other glass articles where a light-diffusing and light-transmitting glass article is desired. However, this invention is particularly applicable to applying a light-transmitting and light-diffusing medium on the inner surface of incandescent glass envelopes which are subsequently fabricated by the addition of filaments, an inert gas and a base into incandescent electric bulbs. In such instances the glass envelope may be made of clear glass, or etched glass in which the etched surface is on the inside surface of the envelope, but it is preferred to use clear glass envelopes since the phosphate layer or medium provides excellent light-diffusing properties without the use of an etched glass surface.

The inert gas employed in making the electric bulbs is usually a mixture of nitrogen and a noble gas of the nature of argon, krypton and xenon, and it is preferred to employ a mixture in which one or more of the last three named gases is present in amounts of 90 to 98% by volume and the nitrogen is present in amounts of about 10 to 2% by volume. A particularly desirable mixture is one contained about 95 to 98% by volume of argon, krypton or xenon, or mixtures thereof, and 5 to 2% by volume of nitrogen.

The calcium phosphate material employed is preferably white bone ash. This material is customarily produced by the calcination of degreased cattle bones after glue extraction. In the past, bone ash has been considered to be principally tricalcium phosphate, but recent X-ray analysis studies show that it is a mixture of about 75–80% hydroxy apatite $[Ca_5(PO_4)_3OH]$ and about 25–20% of beta-tricalcium phosphate. The median particle size of the preferred bone ash is about 20 microns and these particles comprise aggregates of microcrystalline particles of a size of about 0.1 to about 1.0 micron size as measured by an electron microscope. Although this bone ash gives excellent results, bone ash having somewhat different properties can be used. Thus, it is possible to use bone ash having a median particle size range of about 5 to 30 microns.

Other calcium phosphate dusts or powders may be employed, including tricalcium phosphate dentifrice grade and food grade. Also other white forms of tricalcium phosphate may be used. However, in general, tricalcium phosphate is not as satisfactory as bone ash and, accordingly, bone ash is definitely preferred.

In applying the phosphate material to the glass article, the phosphate material in the form of a finely-divided dust or powder is brought into contact, preferably in an air stream, with the heated glass article which has an electrostatic charge sufficiently different from the charge on the phosphate material particles to provide an electric attraction between the glass surface and the phosphate particle. The electrostatic charge on the glass article is preferably produced by mounting the glass articles on an electric conducting metal support and heating the glass article by means of a gas flame produced from an electric conducting metal gas burner and imposing an electric potential between the metal support and the metal burner. The electric potential used is of such a charge and quantity as to provide an electric attraction between the glass surface and the phosphate material, and to cause the phosphate material to be self-adhering, that is, to adhere to the glass surface without the use of a binder or coating substance. As can be seen, the electric attraction required may vary considerably depending upon the intensity and sign of the electrostatic charge of the phosphate material particles.

The temperature to which the glass article is heated may vary somewhat, but is above 100° C. and in any event is below the softening temperature of the glass. In general, temperatures of about 150° C. to about 600° C. may be used.

The amount of phosphate material applied to the glass surface and the thickness of the layer of phosphate material may vary depending on the light-diffusing and light-transmitting properties desired in the glass article. For example, in the case of incandescent glass envelopes, it is usually desirable to provide a layer of phosphate material which is sufficiently thick so that the light emanating from the filaments of the bulb will appear to be uniformly diffused throughout that part of the bulb where light-diffusing properties are desired. In such instances, loss of some of the light-transmitting efficiency of the bulb may be a secondary factor of no substantial importance. For some glass articles, however, light-diffusing properties, although a necessary requisite, are not as important as high efficiency of light transmission, in which case a thin layer of phosphate material sufficient to give light-diffusing properties is all that is required. This ordinarily gives excellent light-transmitting properties.

After the phosphate material layer is applied to the glass surface, the layer is subjected to steam to make the layer self-adhering to the glass surface without the use of a binder. The temperature of the steam used may vary but the steam should not be at a temperature sufficiently above or below the temperature of the glass to cause thermal shock or cracking of the glass. In general, the temperature of the steam should be substantially the same as the temperature of the glass and usually not more than 50° C. above or below the temperature of the glass. However, in instances where the glass used is more resistant to thermal shock than the ordinary type of glass employed, wider variations in temperature are permissible.

In one specific embodiment of this invention, the phosphate materials are preferably applied to the inner surface of clear or inside etched, incandescent glass envelopes used for making incandescent electric bulbs, by the following procedure. An incandescent glass envelope such as illustrated in Figure 1 of Pipkin U.S. Patent No. 2,545,896 is first placed with its open end down on an electricity-conducting metal platform having a circular opening smaller than the diameter of the open end of the envelope so that there is substantially co-axial alignment of the glass envelope with the center of such opening. Each such opening in the metal platform is provided with a jet or orifice positioned in the center of the opening so that a discharge from the jet or orifice is initially substantially along the axis of the glass envelope. The glass envelope is next heated around its periphery by a glass flame from an electricity-conducting metal gas burner to a temperature as hereinbefore indicated, and at the same time the glass surface is given an electrostatic charge sufficient to provide an electric attraction between the glass and phosphate material particles subsequently applied by imposing an electric potential of suitable charge and sign. By operating in this manner, the gas flame conducts electricity from the metal gas burner to the glass surface thus creating an electrostatic charge on the glass surface. The particles of phosphate material are then blown or otherwise projected into the glass envelope through the jet or orifice mentioned above until a layer of the desired thickness is obtained. This is suitably accomplished by suspending the particles in an air stream and discharging the air stream through the jet into the glass envelope. The phosphate material does not build up in the jet or orifice or other equipment used in the form of adherent or glassy deposits as in the case of silica particles obtained from fume silica or silica aquasols or suspensions and hence do not have the disadvantages of the silica materials. Thus, the excess phosphate material, if any, which does not adhere to the glass surface remains as a dust or powder and is readily removed from the equipment used without difficulty. Moreover, the equipment used need not be shut down for cleaning.

The phosphate material layer on the inner surface of the glass envelope is then steamed to make the layer self-adhering to the glass surface. The steaming is carried out as hereinbefore described, and the same jet or orifice may be used to introduce the steam into the glass envelope as is used for the phosphate materials. Also, the steaming may be carried out while the glass envelope is still hot from the flame or after the envelope has been allowed to cool to lower temperatures. However, the steaming should preferably be carried out before the envelope is subjected to jarring or mechanical shock in order to prevent or minimize flaking or loosening of the phosphate layer.

Of course, it will be understood that the above process is not restricted to the application of the phosphate material to a single glass envelope since many glass envelopes may be treated on a single metal platform or on a multitude of such platforms.

The glass envelopes having the phosphate material layer are next assembled into electric glass lamps or bulbs by inserting the electrical resistance-conductor filament assembly and the inert gas, sealing the glass and then affixing the base of the lamp or bulb. These are conventional operations well known in the art.

Although, the color of the finished lamp bulbs is usually white in contrast to the grayish or silver gray appearance of conventional inside frosted lamps or bulbs, the phosphate material particles may be colored with suitable dyes or pigments, preferably non-carbonaceous dyes or pigments, prior to or after their use on the glass article or in the glass envelopes and this permits the production of colored light-diffusing glass articles such as lamps or bulbs in which the color may be red, yellow, green, etc.

The invention will now be further described with reference to the accompanying drawings in which:

Fig. 1 is an elevational view partially in section of one form of light bulb in accordance with the invention;

Fig. 2 is an elevational view partially in section of a second form of electric incandescent light bulb in accordance with the invention;

Figure 3:
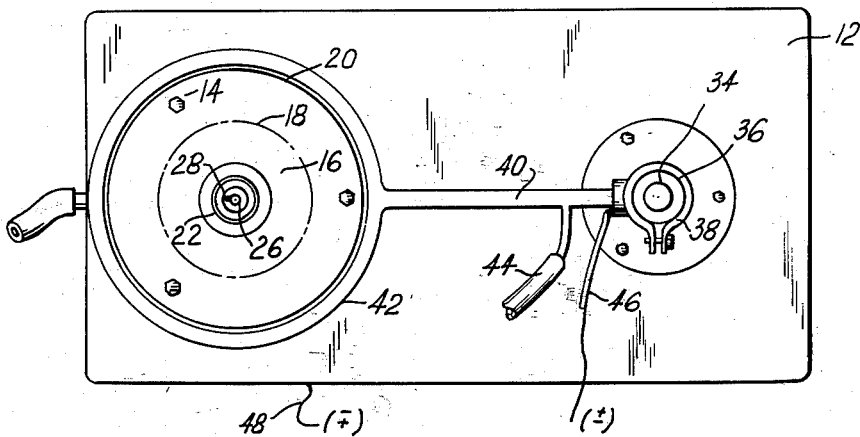
Fig. 3 is a top plan view of one form of apparatus suitable for practicing the invention.

With particular reference to Fig. 1 of the drawings, the reference numeral 5 designates a clear glass bulb having a conventional base 6 and having a substantially uniform light-diffusing and light-transmitting layer 7 of phosphate material (for example, white bone ash particles), which layer is self-adhering to the glass and covers the entire visible surface of the glass bulb.

With specific reference to Fig. 2 of the drawings, the reference numeral 8 designates a glass bulb, the inner surface of which has been etched chemically to give a frosted appearance. This bulb has a conventional base 9 and a substantially uniform light-diffusing and light-transmitting layer 10 of phosphate material (for example, white bone ash particles), which layer is self-adhering to the etched glass surface and covers the entire inner surface of the bulb through which light is transmitted.

Figure 4:
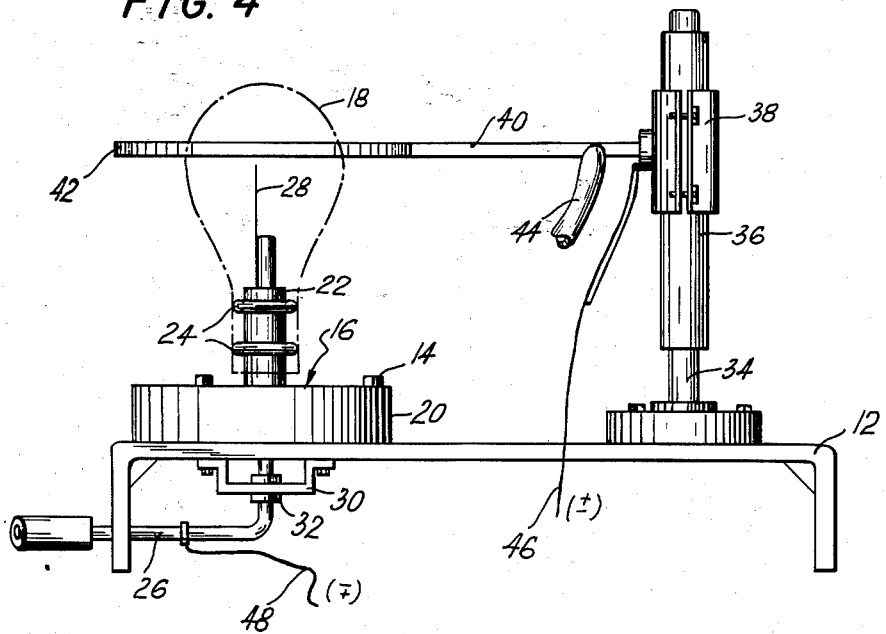
Fig. 4 is an elevational view of the apparatus of Fig. 3.

With particular reference to Fig. 3 and Fig. 4 of the drawings, there is illustrated a horizontally disposed support member 12 to which there is secured by any suitable means, such as bolts 14, a support stand 16 for operatively holding a glass bulb 18 of the type conventionally employed in the manufacture of incandescent electric lights. The stand 16 comprises an annular base member 20 into which is threaded a tubular member 22 of such size that it can suitably extend into the neck of bulb 18. The tubular member 22 is provided with a pair of O-rings 24 which frictionally engage the interior surface of the neck of bulb 18 such that it is normally held securely in position but can be readily removed when desired.

Extending through a suitable opening in support member 12 and through tubular member 22 is a supply tube 26 for introducing into bulb 18 a suspension of finely divided, electrically charged particles of calcium phosphate material. The carrier fluid for the phosphate particles can suitably be air and the suspension of charged particles can be generated by any conventional means, not illustrated. The supply tube 26 is formed of an electrically conductive material, for reasons which will subsequently become apparent, and carries at its upper end, as viewed in Fig. 4, an upwardly extending wire member 28 which operatively serves as an electrode. Tube 26 is retained in position by a bracket 30 secured to the under side of support member 12 and by a bushing or grommet 32 which can be formed of any suitable material.

Carried by support member 12 at a location removed from stand 16 is an upstanding rod member 34 provided with a sheath 36 of electrically insulating material. A support bracket 38 extends about rod 34 and sheath 36 and, by means of a hollow support arm 40, carries a circular gas burner 42 which is so disposed that a gaseous flame is operatively projected onto the bulb 18 from all sides. Burner 42 is supplied with a combustible fuel mixture through a supply conduit 44 connected to support arm 40.

Burner 40 serves as one of a pair of electrodes employed to establish a high voltage field and is connected to a suitable source of electric potential by means of a lead 46. The electrode 28 constitutes the second member of the pair and is connected to the source of electric potential through electrically conducting tube 26 and a lead 48. The relative positions of the two electrodes are such that electrically charged particles introduced into bulb 18 through supply tube 26 are forced to the interior surfaces of the bulb 18 and are there deposited.

In operation, a bulb is placed on stand 16 and is heated to a desired temperature by the burner 42. With burner 42 and electrode 28 connected to a source of high voltage, a suspension of electrically charged particles of phosphate material is then introduced through supply tube 26 and the particles are deposited on the interior surfaces of the bulb as above described. The interior surfaces of the bulb are then steamed to more permanently affix the deposited particles to the glass surface.

A further understanding of the processes and glass articles of this invention will be obtained from the following specific example which is intended to illustrate the invention but not to limit the scope thereof.

*Example*

An electricity-conducting metal platform having a circular opening therein smaller in diameter than the opening in a clear glass incandescent lamp envelope, and having an orifice located in the center of such circular opening was used in this example. A clear glass incandescent bulb envelope having an opening therein— such as the envelope illustrated in Figure 1 of U.S. Patent No. 2,545,896—was inverted over the circular opening in the metal platform so that the axis of the envelope was substantially coincident with the axis of the orifice. A circular, electricity-conducting metal gas burner about two inches larger in diameter than the glass envelope was then positioned around the glass envelope about midway of its height. An electric potential was then imposed between the metal platform and the metal gas burner. A gas flame was then projected on the glass envelope from the burner to heat the envelope to a temperature of 300° C., which was below the softening point of the glass, and this gas flame also created an electrostatic charge on the glass envelope by reason of the electric potential imposed between the metal platform and the metal gas burner.

Next a stream of powdered white bone ash having a median particle size of about 20 microns in air was blown into the glass envelope through the above-mentioned orifice until a light-diffusing and light-transmitting layer of self-adhering bone ash particles had accumulated on the entire inner surface of the glass envelope. The supply of bone ash particles was then discontinued, and steam at a temperature of 250° C. was blown into the glass envelope to fix the bone ash particles on the glass surface. The supply of steam was then discontinued and the glass envelope was allowed to cool. During this operation the glass envelope was sufficiently hot to evaporate all of the residual water deposited on the bone ash layer by the steaming operation. Subsequently, an electrical resistance-conductor filament assembly was inserted into the envelope and the air in the envelope was replaced with a mixture of 97% by volume of argon and 3% by volume of nitrogen and the glass envelope was sealed by heat to provide a glass bulb. A metal base making proper electrical connections with the filament assembly was then affixed to the glass bulb providing an article such as is illustrated in Figure 1. The resulting lamp bulb had a striking white appearance in the unlighted state. When lighted, the bulb gave a uniform diffused light with very little loss in light-transmitting efficiency compared to a clear glass lamp.

Although the above example specifically illustrates the use of bone ash, other alkaline earth phosphate materials can be used including the tri-alkaline earth phosphates and alkaline earth hydroxy apatites. It is also possible to use such alkaline earth phosphates which are white, translucent powders having a large number of small reflecting surface and have refractive indices in the range of from about 1.4 to 1.6 as, for example, calcium pyrophosphate.

What is claimed is:

1. An electric incandescent glass lamp bulb composed of a clear glass bulb having a filament assembly and an inert gas atmosphere sealed in said bulb and having on the inner surface of the light-transmitting portion of the bulb a self-adhering, light-diffusing and light-transmitting layer consisting essentially of bone ash particles having a median particle size of 5 to 30 microns which particles are composed of microcrystalline particles of about 0.1 to about 1 micron.

2. An electric incandescent glass lamp bulb composed of a glass bulb which is etched on the inner surface thereof and has a filament assembly and an inert gas atmosphere sealed in said bulb and is further characterized by having on the etched surface of the bulb a self-adhering, light-diffusing and light-transmitting layer consisting essentially of bone ash particles of a median particle size of 5 to 30 microns.

3. An electric incandescent glass lamp bulb composed of a glass bulb having a filament assembly and an inert gas atmosphere sealed in said bulb and being further characterized in having a self-adhering, light-diffusing and light-transmitting layer consisting essentially of fine particles of bone ash on the inner surface of the light-transmitting portion of said bulb.

4. An incandescent lamp bulb as in claim 3, but further characterized in that the lamp bulb is composed of clear glass.

5. An incandescent lamp bulb as in claim 3, but further characterized in that the bulb is composed of glass which is etched on the inner surface thereof.

6. In the method of producing from a glass envelope a light-diffusing and light-transmitting electric incandescent glass lamp bulb having an inert gas atmosphere and a filament assembly within said bulb, the improvement which comprises applying a light-diffusing and light-transmitting coating on the inner surface of said glass envelope, prior to inserting said filament assembly into said envelope and sealing said envelope, by the following steps: (1) heating said envelope by means of an electricity-conducting gas flame to a temperature above 100° C., but below the softening point of the glass and to impose an electrostatic charge on said envelope, (2) blowing an air stream having suspended therein particles consisting essentially of bone ash of a median particle size range of about 5 to 30 microns and having an electric potential different from that of said envelope into said heated glass envelope until a light-diffusing layer of said bone ash particles is formed on the inner surface of said envelope, the difference in electric potential of said particles and said glass envelope being sufficient to cause the particles to adhere to the inner surface of said heated envelope, and (3) subsequently steaming said layer of bone ash particles until it is self-adhering to said glass surface.

7. The method as in claim 6, but further characterized in that said glass envelope is composed of clear glass.

8. The method as in claim 6, but further characterized in that said glass envelope has a chemically etched inner surface.

9. In the method of producing from a clear glass envelope a light-diffusing and light-transmitting electric incandescent glass lamp bulb having an inert gas atmosphere and filament assembly within said bulb, the improvement which comprises applying a light-diffusing and light-transmitting coating on the inner surface of said envelope, prior to inserting said filament assembly and sealing said envelope, by the following steps: (1) heating said envelope by means of an electricity-conducting gas flame to a temperature above 100° C., but below the softening point of the glass and to impose an electrostatic charge on said envelope, (2) blowing an air stream having suspended therein particles consisting essentially of bone ash having an electric potential different from said glass envelope into said glass envelope until a light-diffusing layer of bone ash is formed on the inner surface of said envelope, said bone ash particles being further characterized in that the median particle size range thereof is about 5 to 30 microns and said particles are composed of microcrystalline particles of a size of about 0.1 to about 1 micron and have an electric potential sufficiently different from that of the glass envelope so that they adhere to the heated glass envelope, and (3) subsequently steaming said bone ash layer until it is self-adhering to said glass surface.

10. The method as in claim 9, but further characterized in that the bone ash is white bone ash.

11. In the method of producing from a glass envelope a light-diffusing and light-transmitting electric incandescent glass lamp bulb having an inert gas atmosphere and filament assembly within said bulb, the improvement which comprises applying a light-diffusing and light-transmitting coating on the inner surface of said envelope, prior to inserting said filament assembly and sealing said envelope, but the following steps: (1) blowing an air stream having suspended therein particles consisting essentially of bone ash into said glass envelope which has been heated with a gas flame to a temperature above 100° C., but below the softening point of the glass envelope and has an electric attraction for said particles until a light-diffusing layer of said bone ash is produced on the inner surface of said glass envelope, said glass envelope being maintained in the defined temperature range during said blowing step, and (2) subsequently steaming said layer of bone ash until it is self-adhering to the surface of said glass envelope.

12. The process as in claim 11, but further characterized in that said steaming is carried out at a temperature varying between about 50° C. above and about 50° C. below the temperature of said glass envelope.

13. A process as in claim 11 but further characterized in that said bone ash is a white bone ash and the median average particles thereof are composed of microcrystalline particles of about 0.1 to about 1 micron.

14. An electric incandescent glass lamp bulb composed of a clear glass bulb having a filament assembly and an inert gas atmosphere sealed in said bulb and having on the inner surface of the light-transmitting portion of said bulb a self-adhering, light-diffusing and light-transmitting layer consisting essentially of particles of bone ash having a median particle size range of about 5 to 30 microns.

References Cited in the file of this patent

UNITED STATES PATENTS

| | | |
|---|---|---|
| 1,698,845 | Gustin | Jan. 15, 1929 |
| 2,402,855 | Toorks | June 25, 1946 |
| 2,438,561 | Kearsley | Mar. 30, 1948 |
| 2,449,655 | Keiffer | Sept. 21, 1948 |
| 2,538,562 | Gustin et al. | Jan. 16, 1951 |
| 2,545,896 | Pipkin | Mar. 20, 1951 |
| 2,706,691 | Schaefer | Apr. 19, 1955 |
| 2,843,504 | Van Bakel et al. | July 15, 1958 |
| 2,878,136 | Gustin | Mar. 17, 1959 |